United States Patent [19]

Shibata

[11] Patent Number: 4,660,112
[45] Date of Patent: Apr. 21, 1987

[54] FEED DEVICE FOR MAGNETIC HEAD

[75] Inventor: Yukio Shibata, Kanagawa, Japan

[73] Assignee: Fuji Photo Film Co., Ltd., Kanagawa, Japan

[21] Appl. No.: 642,862

[22] Filed: Aug. 21, 1984

[30] Foreign Application Priority Data

Aug. 31, 1983 [JP] Japan .................. 58-159965

[51] Int. Cl.⁴ .......................................... G11B 21/08
[52] U.S. Cl. .................................................. 360/106
[58] Field of Search ........................................ 360/106

[56] References Cited

U.S. PATENT DOCUMENTS 3,770,905 11/1973 Sperry ............................. 360/106
4,173,906 11/1979 Altenbokum et al. .
4,366,722 1/1983 Hasler ........................... 360/106 X Primary Examiner—A. J. Heinz
Attorney, Agent, or Firm—Sughrue, Mion, Zinn, Macpeak & Seas

[57] ABSTRACT

This disclosure depicts a feed device for a magnetic head applicable to an electronic still camera or a reproducer in an electronic camera system wherein a subject is pure-electronically still-photographed and recorded in a rotating magnetic disc, and the reproducing of an image is carried out by a television system or a printer.

The feed device for a magnetic head utilizes a planetary gear reduction mechanism to obtain a high reduction ratio, whereby a head carriage carrying the magnetic head is finely fed. The planetary gear reduction mechanism comprises: a sun gear connected to a rotary driving source; a stationary internal gear wheel disposed concentrically with the sun gear therearound; a rotary internal gear wheel for the output disposed concentrically with the stationary internal gear wheel; at least one first planetary gear being in mesh with the stationary internal gear wheel as well as the sun gear; at least one second planetary gear being in mesh with the rotary internal gear wheel as well as the sun gear; and an arm member for rotatably supporting said first and second planetary gears so that the planetary gears can revolve respectively around the sun gear. The rotary internal gear wheel for the output is connected to the head carriage carrying the magnetic head through the rotation-linear movement converting mechanism and performs the fine feed of the magnetic head, e.g. by 100 μm with high accuracy.

14 Claims, 7 Drawing Figures

F I G. 1
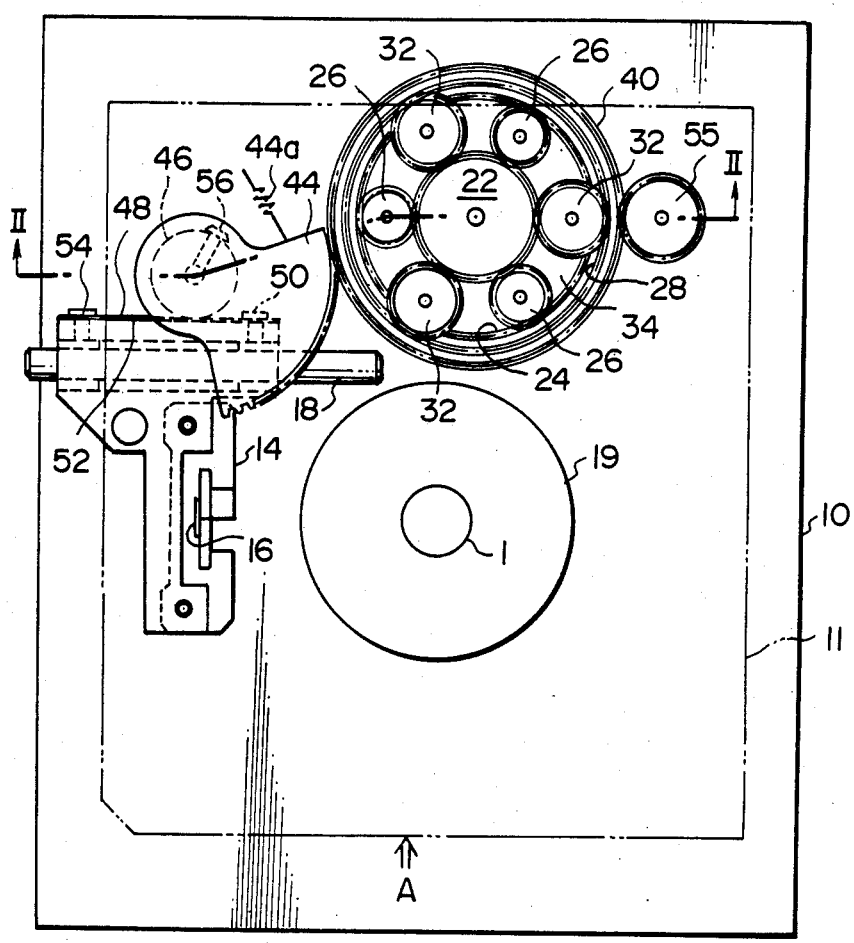

(A)

(B)

FEED DEVICE FOR MAGNETIC HEAD

BACKGROUND OF THE INVENTION

1. Field of the Invention

This invention relates to a feed device for a magnetic head, and more particularly to a feed device for a magnetic head for performing the recording into a cassette type magnetic disc or reproducing therefrom.

2. Description of the Prior Art

Recently, there has been developed an electronic still camera system wherein an image pickup device such as a charge coupled device (CCD) or an image pickup tube is combined with a recording device using a magnetic disc inexpensive as a recording medium and yet having a comparatively high memory capacity, a subject is still-photographed pure-electronically and recorded into a rotating magnetic disc, and the reproducing of an image is carried out by a television system, a printer or the like, and has become the object of public attention.

In an image recording or reproducing system using such a magnetic disc as described above, a magnetic disc having a diameter of about 50 mm is used, and further, the feed pitch of the magnetic head is about 100 $\mu$m, which is by far smaller than that of an ordinary floppy disc, and consequently, the magnetic head sould be moved with very high accuracy. Normally, in the feed device for the magnetic head of the conventional floppy disc, a head carriage carrying the magnetic head is moved by a stepping motor directly through a rotation-linear movement converting mechanism.

However, if the system, in which the head carriage is moved by the stepping motor directly through the rotation-linear movement converting mechanism, is applied to the above-described feed device for the magnetic head requiring the aforesaid small feed pitch, then the number of steps of the stepping motor should inevitably become small. Thus, the errors in rotation of the stepping motor are not eliminated, whereby the accuracy in pitch feed of the magnetic head is disadvantageously deteriorated. On the other hand, if it is to be tried to use a reduction gear mechanism consisting of a plurality of spur gears to materialize the feed of the magnetic head with high accuracy, then a multitude of gears is required to obtain a high reduction ratio, and moreover, a large installation space for the multitude of gears is required. In consequence, as the feed device for the magnetic head used in an electronic camera or reproducer using the magnetic disc of a small diameter and limited in space, it is not proper to use the ordinary gear reduction mechanism consisting of the spur gears. Further, in the cassette portion of the cassette type magnetic disc used for the electronic still camera system, there are provided a misrecord preventive pawl for preventing a recorded track from being recorded again, a counter mechanism for indicating the number of recorded tracks and the like. In consequence, in the electronic camera or the reproducer, it is necessary to provide a detecting mechanism for the misrecord preventive portion, a counter driving mechanism and the like at associated positions, respectively. In consequence, it is extremely difficult to provide the gear mechanism to obtain a high reduction ratio so that the above-described mechanisms can be provided.

SUMMARY OF THE INVENTION

The present invention has been developed to obviate the above-described disadvantages of the prior art and has its object the provision of a feed device for a magnetic head, wherein a speed reduction mechanism does not require a large installation space, and moreover, the magnetic head can be finely fed with high accuracy.

To this end, the present invention contemplates that, in a feed device for a magnetic head, wherein the magnetic head for recording into a rotating magnetic disc or reproducing therefrom is moved in the radial direction of the magnetic disc, a planetary gear reduction mechanism capable of obtaining a high reduction ratio is interposed between a rotary driving source and a head carriage carrying the magnetic head. This planetary gear reduction mechanism comprises: a sun gear connected to a rotary driving source; a stationary internal gear wheel disposed concentrically with the sun gear; a rotary internal gear wheel for the output disposed concentrically with the stationary internal gear wheel; planetary gears in mesh with the stationary internal gear wheel as well as the sun gear, and further, in mesh with the rotary internal gear wheel as well as the sun gear; and an arm member rotatably supporting the planetary gears so that the planetary gears can revolve along predetermined paths, respectively, around the sun gear. This rotary internal gear wheel for the output in the planetary gear reduction mechanism is connected to the rotation-linear movement converting mechanism for converting a rotary movement to a linear movement to move the head carriage carrying the magnetic head in the radial direction of the magnetic disc, so that the magnetic head can be finely fed with high accuracy.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and therein:

FIG. 1 is a schematic plan view showing one embodiment of the feed device for the magnetic head according to the present invention;

DETAILED DESCRIPTION OF THE INVENTION

Figure 2:
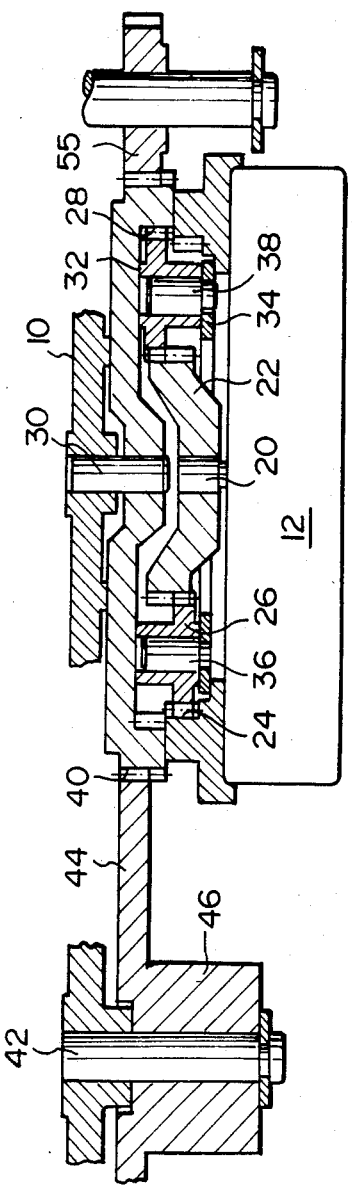
FIG. 2 is a sectional view taken along the line II—II in FIG. 1.

Detailed description will hereunder be given of the preferred embodiment of the feed device for the magnetic head according to the present invention with reference to the accompanying drawings.

As shown in FIG. 1, a main body 10 of a cassette type magnetic disc recording device such for example as an electronic camera or a reproducing device is formed into a rectangular shape. As indicated by hypothetical lines in FIG. 1, rested on this main body 10 is a disc pack 11 and a magnetic disc housed in the disc pack 11 is rotated by a rotary shaft 1 of a motor 19 for driving the disc. The disc pack 11, as the front and rear surfaces being shown in FIGS. 4(A) and 4(B), respectively, comprises a pack body 201 and a magnetic disc 101 rotatably housed in the pack body 201. The disc pack 11 is rested on the main body 10 of the electronic camera or the like such that the front surface thereof is directed upwardly, so that end faces indicated by arrows A in FIG. 1 and FIG. 4(A) can be directed in a direction common with each other.

Figure 4:
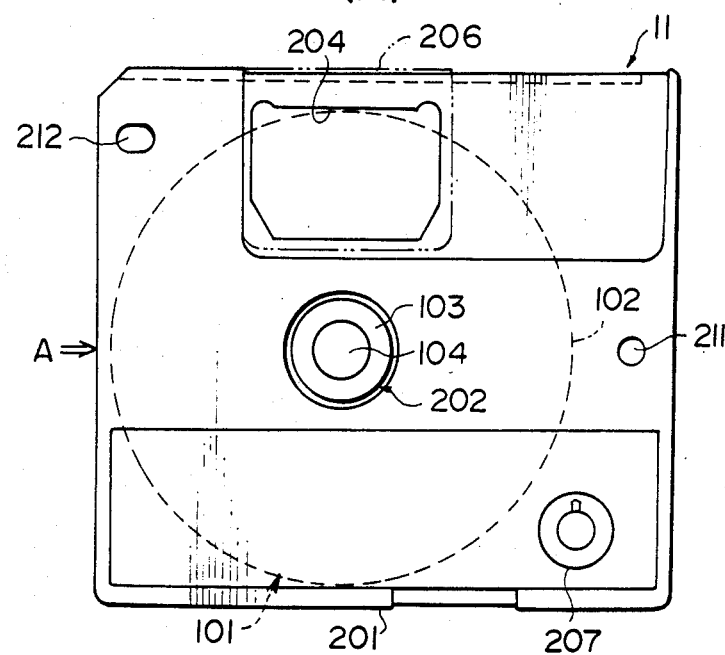
FIG. 4(A) is a front view showing the magnetic disc pack and FIG. 4(B) is a rear view showing the magnetic disc pack.
Figure 4:
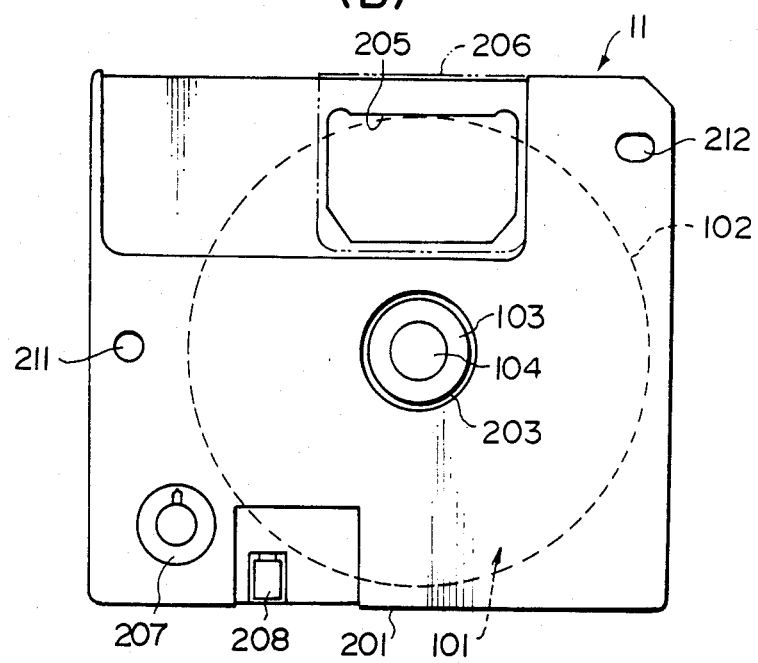

The magnetic disc 101 comprises a magnetically recording material 102 of a disc-shape and formed on the rear surface thereof with a record layer and a center core 103 formed at the center thereof with a hole 104 engageable with the rotary shaft 1 of the motor 19 for driving the disc. The pack body 201 has openings 202 and 203 for exposing the center core 103 of the magnetic disc 101 and openings 204 and 205 for exposing a recording surface and a non-recording surface of the magnetic disc 101, and can perform the recording and-/or reproducing by projecting the magnetic head, which will be described hereunder, to the recording surface through the opening 205. A member indicated by two-dot chain lines 206 in FIGS. 4(A) and 4(B) is a shutter, and, when the pack body 201 is inserted into or removed from the electronic camera or the reproducer, the shutter 206 slides relative to the pack body 201, thereby opening or closing the openings 204 and 205.

Designated at 207 is a counter indicating portion for the number of the recorded tracks, which, for example, rotates in operational association with a head feeding mechanism provided on the main body of the electronic camera, thus indicating the number of the recorded tracks. Denoted at 208 is a misrecord preventive pawl similar to a miserase preventive pawl of an audio cassette, which is provided on the rear surface of the pack body 201, and the presence or absence of the pawl is detected by a detecting mechanism such as the main body of camera or that of reproducer, thereby preventing the misrecording from occurring. Indicated at 211 and 212 are openings for positioning the pack body 201, when the pack body 201 is loaded into the main body 10 of camera or that of reproducer.

When the magnetic disc 11 is loaded into the main body 10 of camera or that of reproducer, the magnetic disc driving mechanism, the head and the head driving mechanism, the counter driving mechanism, the detecting mechanism for the misrecord preventive portion and the like are provided at positions associated with positions of the corresponding parts of the magnetic disc pack 11.

Now, the main body 10 of device, as shown in FIG. 1, is slidably provided with a head carriage 14. More specifically, the head carriage 14 has a magnetic head 16 for performing the recording and/or reproducing into or from the magnetic disc in the disc pack 11, and is slidably supported by a guide bar 18 affixed to the main body 10 of device, so that the head carriage 14 can be movable to the right or left in FIG. 1, being guided by the guide bar 18. Rotation of a stepping motor 12 as shown in FIG. 2 is imparted to the head carriage 14 through a planetary gear reduction mechanism and a rotation-linear movement converting mechanism, both of which will be described hereunder, whereby the magnetic head 16 is finely fed in the radial direction of the magnetic disc 101 in the disc pack 11.

Firstly, description will be given of the planetary gear reduction mechanism with reference to FIG. 2. A pinion 22 as being a sun gear is provided on an output shaft 20 of the stepping motor 12. A stationary internal gear wheel 24 concentric with the sun gear 22 is disposed around the sun gear 22. Disposed between the sun gear 22 and the stationary internal gear wheel 24 is a first planetary gear 26, which is in mesh with the stationary internal gear wheel 24 as well as the sun gear 22. Further, provided concentrically with the stationary internal gear wheel 24 is a rotary internal gear wheel 28, which is rotatably supported by the main body 10 of device through a shaft 30. A second planetary gear 32 is in mesh with the sun gear 22 from outside. This second planetary gear 32 is in mesh with the rotary internal gear wheel 28 disposed concentrically with the sun gear 22. The first and the second planetary gears 26 and 32 are rotatably supported by a retainer 34 as being the common arm member through shafts 36 and 38, respectively. In consequence, the rotary driving force from the stepping motor 12 is imparted to the planetary gear 26 via the sun gear 22. The planetary gear 26, being in mesh with the sun gear 22 and the stationary internal gear wheel 24, turns on its axis, while, revolves along a predetermined path around the sun gear 22 to rotate the retainer 34. The second planetary gear 32, being influenced by the motion of the retainer 34, turns on its axis, while, revolves along a predetermined path around the sun gear 22 at the same speed as the first planetary gear 26, and imparts its turning force at a reduced value to the rotary internal gear wheel 28. External gear 40 is formed on the outer periphery of the rotary internal gear wheel 28. This external gear 40 is in mesh with a segmental gear 44 centered about a shaft 42.

Description will now be given of the rotation-linear movement converting mechanism with reference to FIG. 1. A pulley 46 is formed on the segmental gear 44, and a steel belt 48 is guided around the pulley 46 in an α shape. More specifically, the upper right end portion of the steel belt 48 in FIG. 1 is solidly secured to a side surface 52 of the head carriage 14 by means of a screw 50, and the steel belt 48, after being guided around the pulley 46 by one turn, is solidly secured to the left end portion of the side surface 52 by means of a screw 54. Further, the steel belt 48 is solidly secured to the pulley 46 integrally formed on the segmental gear 44 by means of a screw 56. In consequence, when the external gear 40 turns, the segmental gear 44 turns therealong, whereby the rotary movement value of the segmental gear 44 is converted into a linear movement value. Since the head carriage 14 is connected to the segmental gear 44 through the steel belt 48, the head carriage 14 is moved by the aforesaid linear movement value. Additionally, a member designated at 44a in FIG. 1 is a spring for eliminating a backlash.

In external gear 40 formed on the outer periphery of the rotary internal gear wheel 28 is in mesh with a gear 55 of a driving mechanism for a counter indicating portion 207 indicating the number of the recorded tracks in the magnetic disc, in addition to the segmental gear 44, thereby driving the counter indicating portion 207 provided on the disc pack 11 in accordance with the movement of the magnetic head 16.

The following is the action of the embodiment with the above-described arrangement according to the present invention.

Firstly, the sun gear 22 directly connected to the output shaft 20 of the stepping motor 12 imparts its turning force to the first planetary gear 26, then, the planetary gear 26, being in mesh with the stationary internal gear wheel 24 as well as the sun gear 22, turns on its axis, while, revolves along a predetermined path around the sun gear 22 to rotate the retainer 34. On the other hand, the second planetary gear 32 is in mesh with the rotary internal gear wheel 28 as well as the sun gear 22, turns on its axis under the influence of the rotation of the retainer 34, while, revolves along a predetermined path around the sun gear 22 at the same speed as the first planetary gear 36, to impart its turning force to the rotary internal gear wheel 28.

Next, a reduction ratio $\rho$ between the sun gear 22 on the input side and the rotary internal gear wheel 28 on the output side will be obtained by a method of calculating the rotation numbers of the planetary gear train.

Za: The number of teeth on the sun gear 22
Zb: The number of teeth on the first planetary gear 26
Zc: The number of teeth on the stationary internal gear wheel 24
Zd: The number of teeth on the second planetary gear 32
Ze: The number of teeth on the rotary internal gear wheel 28
L: Arm 34 (retainer)

(1)

|  | Sun gear 22 | Arm | Internal gear wheel 24 |
|---|---|---|---|
| wholly fixed (all three members) | 1 | 1 | 1 |
| Arm fixed | $(-1) \times (-1) \times Zc/Za$ | 0 | $-1$ |
| Added together | $1 + Zc/Za$ | 1 | 0 |

(2)

|  | Sun gear 22 | Arm | Internal gear wheel 28 |
|---|---|---|---|
| wholly fixed (all three members) | 1 | 1 | 1 |
| Arm fixed | $Zc/Za$ | 0 | $-Zc/Ze$ |
| Added together | $1 + Zc/Za$ | 1 | $1 - Zc/Ze$ |

Consequently, the reduction ratio $\rho = (1 - Zc/Ze / 1 + Zc/Za)$
If
  Za = 33
  Zb = 15
  Zc = 63
  Zd = 16
  Ze = 60
then $\rho = (1 - 63/66 / 1 + 63/33) = 1/64$ Thus, a very high reduction ratio is obtainable by use of the planetary gear reduction mechanism.

The turning force thus reduced is imparted to the segmental gear 44, which, through the agency of the rotation-linear movement converting mechanism, moves the head carriage 14 by one track each time along the guide bar 18. Namely, for example, in the aforesaid reduction system, if the stepping motor 12 is moved by 16 steps and the reduction ratio reaches 1/64 by means of the planetary gear reduction mechanism, then the head carriage 14 can be moved by 100 $\mu$m. Thus, the magnetic head 16 is moved by one track (100 $\mu$m) each time with respect to the magnetic disc 101 in the disc pack 11, whereby the recording and/or reproducing can be performed.

Figure 5:
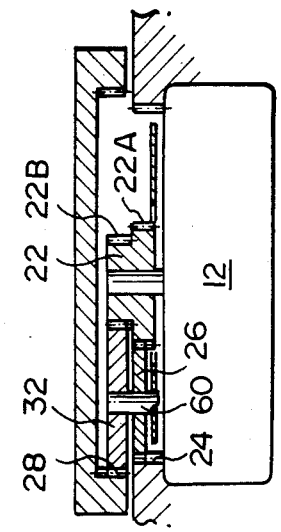
FIG. 5 is a sectional view showing a modification of the planetary gear reduction mechanism.
Figure 3:
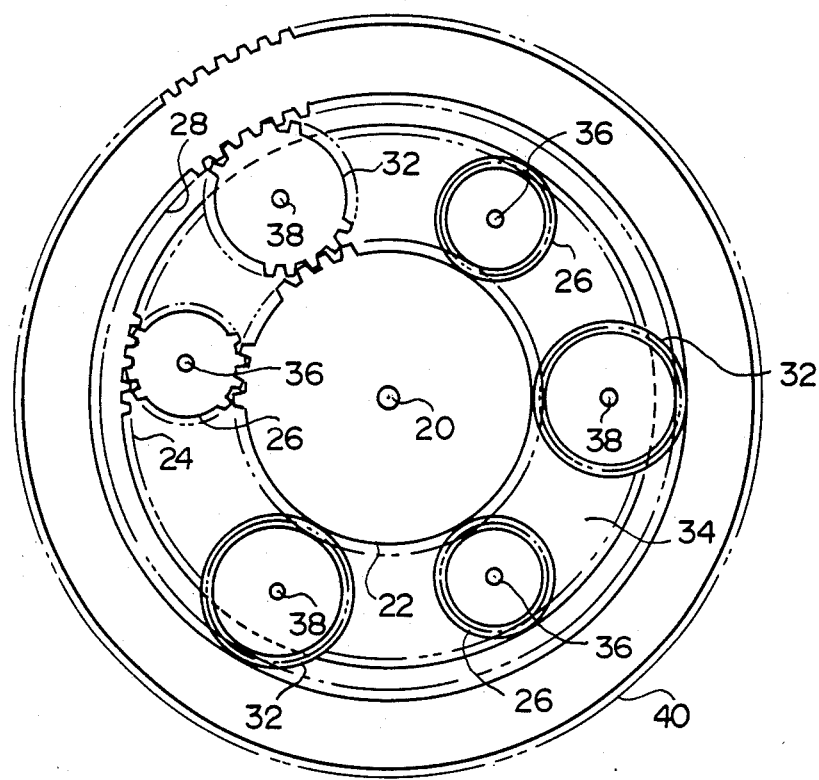
FIG. 3 is a schematic plan view showing the planetary gear reduction mechanism used in the feed device for the magnetic head according to the present invention.

In the above embodiment, in the planetary gear mechanism as being the reduction system, the first and second planetary gears 26 and 32 are shifted in positions, respectively, and supported by the shafts separate from each other, i.e. the shafts 36 and 38, the planetary gears 26 and 34 may be provided on one and the same shaft so that the planetary gears 26 and 32 are rotatable independently of each other as shown in FIG. 5. In this case, the sun gear 22 is formed to have two gears in stepped construction including gears 22A and 22B to be in mesh with the first and the second planetary gears 26 and 32, respectively.

Figure 6:
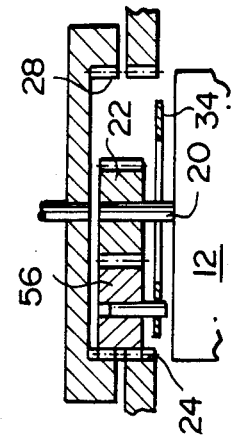
FIG. 6 is a sectional view showing another modification of the planetary gear reduction mechanism.

In the above embodiment, the first gear 26 is brought into mesh with the stationary internal gear wheel 24 as well as the sun gear 22 and the second planetary gear 32 is brought into mesh with the rotary internal gear wheel 28 as well as the sun gear 22, however, as shown in FIG. 6, a commonly used planetary gear 56 brought into mesh with both the stationary and rotary internal gear wheels 24 and 28 may be provided for the speed reduction. More specifically, the planetary gear 56 is constructed to be in mesh with both the stationary and rotary internal gear wheels 24 and 28. In this case, in the rotary internal gear wheel 28, teeth are shifted so as to be in mesh with the planetary gear 56, the rotary internal gear wheel 28 is formed to have the teeth slightly different in number from the teeth of the stationary internal gear wheel 24.

As has been described hereinabove, in the feed device for the magnetic head according to the present invention, the reduction mechanism using the planetary gear mechanism is interposed for the reduction between the rotary driving source and the head carriage, so that, even in the electronic camera or reproducer, both of which have a limited installation space, a reduction device having a high reduction ratio can be disposed therein. As the result, the reduction device does not require much space, so that the reduction device can be disposed at positions not mechanically interfering with the detecting mechanisms and the like disposed at positions associated with the counter indicating mechanism and the misrecord preventive pawl provided on the magnetic disc pack, for detecting the counter indicating mechanism and the pawl. Furthermore, the reduction device consisting of the planetary gear mechanism can obtain a high reduction ratio, so that the stepping motor as being the rotary driving source can rotate by a multitude of step numbers per track of the magnetic disc, thereby minimizing errors in lead. Furthermore, the utilization of the planetary gear mechanism results in reduced number of parts irrespective of high or low reduction ratio.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A feed device for a magnetic head, wherein said magnetic head moves in the radial direction of a magnetic disc to perform the recording and/or reproducing into said magnetic disc or therefrom, comprising:
   a rotary driving source;

a planetary gear reduction mechanism, having an input gear connected to said rotary driving source, an output gear and planetary gear means disposed in meshing engagement with said input and output gears;

a rotation-linear movement converting mechanism connected to said output gear for converting a rotary motion of said output gear into a linear movement; and a head carriage provided with said magnetic head and connected to said rotation-linear movement mechanism for moving said head carriage and magnetic head in the radial direction of said magnetic disc.

2. A feed device for a magnetic head as set forth in claim 1, further comprising counting means operatively connected to said output gear for counting the number of tracks on said magnetic disc which have been recorded.

3. A feed device for a magnetic head as set forth in claim 1, wherein said rotation-linear movement converting mechanism comprises:

a pulley meshingly connected to a gear on the output side of said planetary gear reduction mechanism; and a belt guided around said pulley, solidly secured to said pulley and solidly secured at both ends thereof to said head carriage.

4. A feed device for a magnetic head as set forth in claim 1, wherein said head carriage is guided by a guide bar to be moved in the radial direction of said magnetic disc.

5. A feed device for a magnetic head, wherein said magnetic head moves in the radial direction of a rotating magnetic disc to perform the recording and/or reproducing into said magnetic disc or therefrom, comprising:

a rotary driving source;

a sun gear connected to said rotary driving source;

a stationary internal gear wheel disposed concentrically with said sun gear and therearound;

a rotary internal gear wheel disposed concentrically with said stationary internal gear wheel;

at least one first planetary gear being in mesh with the stationary internal gear wheel as well as the sun gear;

at least one second planetary gear being mesh with the rotary internal gear wheel as well as the sun gear;

an arm member for rotatably supporting said first and second planetary gears so that both the planetary gears can revolve respectively around the sun gear;

a rotation-linear movement converting mechanism connected to said rotary internal gear wheel, for converting a rotary motion of said rotary internal gear wheel into a linear movement; and a head carriage provided with the magnetic head, and connected to said rotation-linear movement converting mechanism, for moving the head carriage and magnetic head in the radial direction of the magnetic disc.

6. A feed device for a magnetic head as set forth in claim 5, wherein said first planetary gear and said second planetary gear are commonly supported by one and the same shaft.

7. A feed device for a magnetic head as set forth in claim 5, wherein said magnetic disc is housed in a disc pack and external teeth formed on the outer periphery of said rotary internal gear wheel for the output of the planetary gear reduction mechanism is in mesh with a gear for driving a counter indicating portion for indicating the number of recorded tracks of said magnetic disc.

8. A feed device for a magnetic head as set forth in claim 5, wherein said rotation-linear movement converting mechanism comprises:

a pulley meshingly connected to external teeth formed on the outer periphery of said rotary internal gear wheel for the output of said planetary gear reduction mechanism; and a belt guided around said pulley, solidly secured to said pulley and also solidly secured at both ends thereof to said head carriage.

9. A feed device for a magnetic head as set forth in claim 5, wherein said head carriage is guided by a guide bar to be moved in the radial direction of said magnetic disc.

10. A feed device for a magnetic head, wherein said magnetic head moves in the radial direction of a rotary magnetic disc to perform the recording and/or reproducing into said magnetic disc or therefrom, comprising:

a rotary driving source;

a sun gear connected to said rotary driving source;

a stationary internal gear wheel disposed concentrically with said sun gear and therearound;

a rotary internal gear wheel disposed concentrically with said stationary internal gear wheel;

at least one planetary gear being in mesh with the stationary internal gear wheel as well as the sun gear, and further, in mesh with the rotary internal gear wheel as well as the sun gear;

an arm member for rotatably supporting the planetary gears so that the planetary gear can revolve around the sun gear;

a rotation-linear movement converting mechanism connected to said rotary internal gear wheel, for converting a rotary motion of said rotary internal gear wheel into a linear movement; and a head carriage provided with the magnetic head, and connected to said rotation-linear movement converting mechanism, for moving the head carriage and magnetic head in the radial direction of the magnetic disc.

11. A feed device for a magnetic head as set forth in claim 10, wherein said rotary internal gear wheel and said stationary internal gear wheel each have a different number of teeth.

12. A feed device for a magnetic head as set forth in claim 10, wherein said magnetic disc is housed in a disc pack and external teeth formed on the outer periphery of said rotary internal gear wheel for the output of the planetary gear reduction mechanism is in mesh with a gear for driving a counter indicating portion for indicating the number of recorded tracks of said magnetic disc.

13. A feed device for a magnetic head as set forth in claim 10, wherein said rotation-linear movement converting mechanism comprises:

a pulley meshingly connected to external teeth formed on the outer periphery of said rotary internal gear wheel for the output of said planetary gear reduction mechanism; and a belt guided around said pulley, solidly secured to said pulley and also solidly secured at both ends thereof to said head carriage.

14. A feed device for a magnetic head as set forth in claim 10, wherein said head carriage is guided by a guide bar to be moved in the radial direction of said magnetic disc.

* * * * *